Dec. 8, 1931.  C. C. SCHARPENBERG ET AL  1,835,341

BALL BEARING NUT ASSEMBLY

Filed March 11, 1930

Inventors
Charles C. Scharpenberg
Leroy G. Gates
By Lyon & Lyon
Attorneys

Patented Dec. 8, 1931

1,835,341

UNITED STATES PATENT OFFICE

CHARLES C. SCHARPENBERG AND LEROY G. GATES, OF BAKERSFIELD, CALIFORNIA, ASSIGNORS TO STANDARD OIL COMPANY OF CALIFORNIA, OF SAN FRANCISCO, CALIFORNIA, A CORPORATION OF DELAWARE

BALL BEARING NUT ASSEMBLY

Application filed March 11, 1930. Serial No. 434,957.

This invention relates to screw thread structures, and particularly to a ball bearing nut assembly which is particularly applicable for use in connection with a member which is adapted to be reciprocated by changing a rotary movement into a reciprocatory movement by the threading of one member through another, and is particularly adapted for use in connection with a deep well pump like that illustrated in the Charles C. Scharpenberg Patent No. 1,428,300 which discloses a reversible motor rotating a threaded rod first in one direction and then in another to reciprocate a pump plunger which is likewise held from rotation.

It is a well known fact that the efficiency of a screw thread as a means of transmitting power is very low. When a screw and nut is used as a medium of power transmission, this efficiency does not, in general practice, exceed 30%. The efficiency of a screw thread is given by the expression $$\text{Efficiency} = \frac{\tan. a \ (1 - f \tan. a)}{\tan. a. + f}$$

In this expression the angle $a$ is the thread angle and $f$ is the coefficient of friction. If the coefficient of friction is reduced, the efficiency will be increased.

It is therefore an object of this invention to produce a screw thread and nut in which the efficiency will be high due to the reduction of the friction.

Another object of this invention is to provide a screw and nut construction in which balls are employed at all points of contact between the screw and nut structure so as to reduce the coefficient of friction between the screw and nut.

Another object of this invention is to provide a screw and nut construction in which balls or roller members are employed for reducing the friction at all points of contact between the screw and the nut, and also to provide a means for continuously feeding ball, or roller bearing members, to a position between the screw and nut assembly.

Other objects and advantages of this invention it is believed will be apparent from the following detailed description of a preferred embodiment thereof as illustrated in the accompanying drawings.

In the preferred embodiment of our invention illustrated in the accompanying drawings, 1 illustrates a screw having a continuous thread or helical raceway 2 ground on its outer surface. The raceway 2 is of the same form and pitch as that of a mating helix or raceway 3 formed on the inner periphery of the nut bodies 4.

The continuous enclosed helix thus formed is filled with roller bearing, or anti-friction, members herein illustrated as the balls 5.

Figure 1:
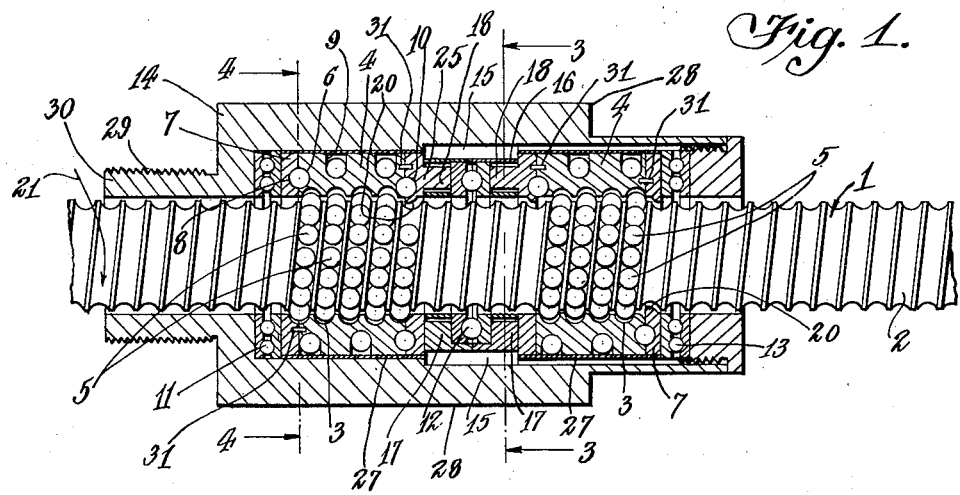
Figure 1 is a sectional view of a ball bearing nut and screw assembly embodying our invention.
Figure 2:
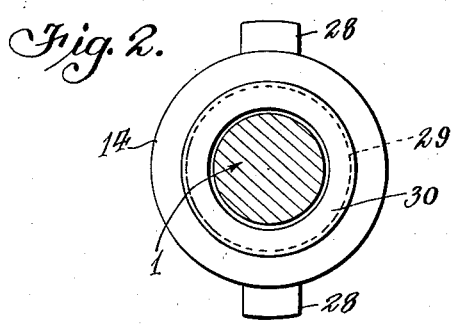
Figure 2 is an end view thereof.
Figure 3:
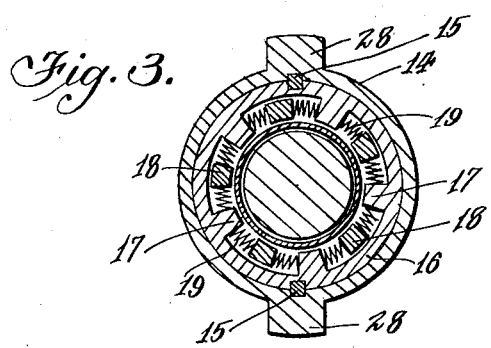
Figure 3 is a sectional end view taken substantially on the line 3—3 of Figure 1.
Figure 4:
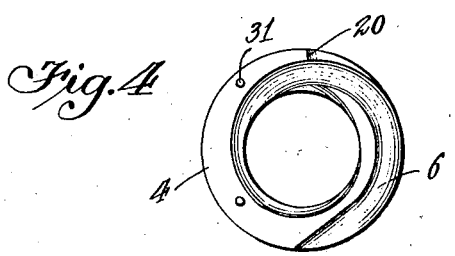
Figure 4 is a sectional view taken substantially on the line 4—4 of Figure 1.
Figure 5:
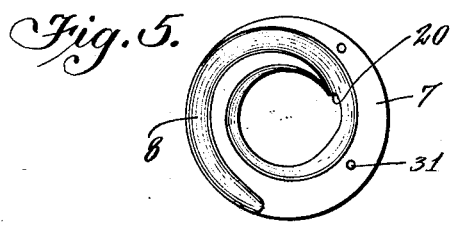
Figure 5 is a sectional view taken substantially on the line 4—4, but viewed from the reverse direction.
Figure 6:
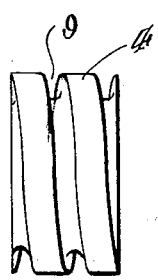
Figure 6 is a side elevation of the nut body.

It will be obvious that if the screw 1 is turned to the right as viewed in Figure 1, and the nut bodies 4 are held from rotation, that the nut bodies will be caused to move parallel to the axis of the screw in the same manner as if a thread engaged between the nut and screw.

If we assume that the screw 1 is rotated to the right, as illustrated by the arrow 21, then the nut bodies 4 will be drawn to the right and the balls 5 will roll along the screw 1 and move to the left end of the nut bodies 4. The balls 5 will thus be continuously displaced from between the screw 1 and nut bodies 4.

In order to provide a means for continuously maintaining the balls 5 in position between the screw 1 and nut bodies 4 to provide anti-friction members, the following means are preferably provided:

Formed in the face of the nut bodies 4 are spiral grooves 6 which are of semi-circular section and connect the inside helix formed of the raceways 2 and 3 with a helix 9 formed on the outer peripheries of the nut bodies 4. Nut caps 7 are fitted on the end faces of the nut bodies 4. In the face of the nut cap 7 is ground a spiral of semi-circular section illustrated at 8, which meets with the spiral 6 to form a spiral passage of circular cross-section adapted to receive the balls 5 as they roll to the end of the nut bodies 4 and to transfer the said balls to the outside of the nut bodies 4 and guide them into the helixes 9.

The helix 9 is of opposite rotation to the direction of rotation of the inner helixes formed by the mating raceways 2 and 3. As the balls 5 are fed toward one end of the screw 1 through the helix formed by the raceways 2 and 3, they would be fed toward the opposite end of the screw 1 through the helix 9. At the opposite end of each nut body 4, at 10, is a spiral passage of circular section which connects the outside helix with the inside helix formed by the raceways 2 and 3. The helix 9 is exactly the same as the helix formed by the half spirals 6 and 8.

In operation in order to insure that a continuous line or ring of balls 5 will be at all times positioned between the screw 1 and the nut bodies 4, the entire line of travel of the balls consist of the helix formed by the raceways 2 and 3 and the helixes formed by the elements 6, 8, 8 and 10 are completely filled with the anti-friction members 5.

While we have herein disclosed our preferred embodiment of this invention as including two matched assemblies of nut bodies 4 operatively connected with the screw 1, it is to be understood that this is not essential to our invention, but only one nut body formed may be employed if desired. In practical constructions, however, due to the difficulties which attend the grinding of an internal helical raceway of any great length, we have found it desirable to combine more than one nut body 4 in forming a single screw and nut assembly, and any suitable or desirable number of these nut bodies may be extended to and along the screw 1 as herein illustrated. When employing two or more nut bodies on a single screw 1, it is desirable for the nut bodies 4 to divide the load equally. In order for the nut bodies 4 to divide the load equally, it is preferable that the sections or nut bodies be so assembled in such a manner that the end pressure due to the load will be transmitted to the end sections, and each section transmit an equal amount of the load to the screw.

In order to accomplish this it is preferable that the nut bodies 4 be yieldably held from rotation and that all friction between the end faces of the nut bodies 4 be as nearly eliminated as possible.

In order to reduce the friction between the end faces of the nut sections, the annular ball thrust bearings 11, 12 and 13 are placed between the section of nut bodies and the ends of the housing within which they are mounted. As herein illustrated, the shell 14 which encloses the entire assembly is keyed to a ring 16 by means of keys 15. On the inner surface of the ring 16 there is formed a plurality of spaced ears or lugs 17 which extend inwardly. On the outer surface of the nut body caps 25 complementary spaced ears or lugs 18 are formed which extend outwardly from the end caps 25 to project between the lugs 17. Spaced between the lugs 17 and 18 are coil springs 19.

In operation the tendency of the nut bodies 4 to rotate is transmitted through the lugs 18 to the springs 19, and through the springs 19 to the lugs 17 and to the ring 16. The ring 16 is keyed to the shell or housing 14 and hence the nut bodies are yieldably held from rotation. The nut sections 4 are thus held separately from rotating in the housing 14, thereby allowing the different nut bodies to assume equal loads.

In order to insure that the balls 5 leave the internal raceway and enter the spiral transition groove or helix 9 smoothly, lips 20 are formed on the insides of the nut caps 7 and 25 which extend into the helix formed by the raceways 2 and 3 on the screw 1 to a point to pick up the balls 5 as they are pushed in a direction to engage the lip 20. The lips of the opposed ends of the nut bodies 4 thus provide a means of insuring the lifting of each ball 5 out of its groove in the screw and into the spiral transition groove irrespective of the direction of rotation of the screw 1 in the nut bodies 4. Thus if the screw 1 is rotated in one direction, the balls 5 will be fed toward one end of the nut body and will be transferred by the nut body to the opposite end thereof, and when the screw 1 is turned in a reverse direction to reciprocate the housing 14, the balls will be fed in a reverse direction and returned to the reverse end of the nut bodies 4. The end caps 7 are prevented from turning on the nut bodies 4 by keys or pins 31.

In the forming of the external spirals 9 on the nut bodies 4, the spirals are merely cut or ground from the outer periphery of the nut bodies and are enclosed by means of sleeves 27 which fit over the nut bodies 4 but are spaced from the interior peripheries of the housing 14.

The housing 14 is prevented from rotating in any suitable or desirable manner such, for example, as by means of lugs 28 which extend from diametrically opposite points of the housing 14 and fit within guideways formed within any suitable or desirable structure. The article to be reciprocated, whether it be a pump plunger or the like, is secured to the housing 14 in any suitable or desirable manner such, for example, as by screw threading the same to the threads 29 formed on the reduced section 30 of the housing 14.

Having fully described our invention, it is to be understood that we do not wish to be limited to the details herein set forth, but our invention is of the full scope of the appended claims.

We claim:

1. A ball bearing nut and screw assembly, the nut being made up of several sections, each section including an individual nut, and the said sections being so assembled as to distribute the load evenly between the nut sections.

2. A ball bearing nut and screw assembly including a nut made up of several sections, each section being an individual nut, a nut housing, and means interposed between the nut sections and the housing to yieldably hold the nut sections from rotation and so assembled as to distribute the load evenly between the nut sections.

3. A ball bearing nut and screw assembly including a nut made up of several sections, each section being an individual nut, a housing enclosing the nut sections, complementary lugs formed between the housing and nut sections, and an elastic medium interposed between the interlocking lugs, and the assembly of the nut sections being so as to distribute the load evenly between the nut sections.

4. A ball bearing nut and screw assembly including a nut made up of several sections, each section being an individual nut, a housing enclosing the nut sections, complementary lugs formed between the housing and nut sections, springs interposed between the interlocking lugs, and the assembly of the nut sections being so as to distribute the load evenly between the nut sections.

5. A ball bearing nut and screw assembly including a screw and a nut made up of several sections, anti-friction members interposed between the nut sections and screw to form a helical thread, and means for yieldably holding the nut sections from rotating with the screw so as to distribute the load evenly between the nut sections.

6. A ball bearing nut and screw assembly including a screw, a nut made up of several sections, means for yieldably holding the nut sections from rotation relative to the screw, and a ball thrust bearing interposed between the nut sections.

7. In a device of the class described, the combination of a screw, a nut made of several sections, a housing enclosing the nut sections, and an elastic medium interposed between the nut sections and the housing so as to distribute the load evenly between the nut sections.

8. In a ball bearing nut and screw assembly, the combination of a screw, a nut made of several sections, a housing enclosing the nut sections, end thrust bearing means at the outer end of the nut section between the ends of the nut sections and the housing, and an elastic medium interposed between the nut sections and the housing so as to distribute the load evenly between the nut sections.

9. In a ball bearing nut and screw assembly, the combination of a screw, a nut made of several sections, a housing enclosing the nut sections, end thrust bearing means at the outer end of the nut section between the ends of the nut sections and the housing, an elastic medium interposed between the nut sections and the housing so as to distribute the load evenly between the nut sections, and an end thrust bearing means interposed between the nut sections.

Signed at Bakersfield, California, this 1st day of March, 1930.

CHARLES C. SCHARPENBERG.
LEROY G. GATES.